Patented June 5, 1951

2,556,084

UNITED STATES PATENT OFFICE 2,556,084

METHOD FOR PROMOTING GROWTH OF MOLD IN GRAIN STILLAGE AND USE OF SAME IN THE PRODUCTION OF ALCOHOL

Frank M. Hildebrandt, Baltimore, and Norris M. Erb, Riviera Beach, Md., assignors to U. S. Industrial Chemicals, Inc.

No Drawing. Application April 2, 1946, Serial No. 659,144

7 Claims. (Cl. 195—32)

This invention relates to a method for promoting the growth of mold in grain stillage, and to the use of mold so produced in the production of ethyl alcohol by fermentation.

Processes for the conversion of starch to sugar for fermentation ethyl alcohol production have until recent years been dependent almost entirely on the use of malt as a medium for promoting this conversion. Especially in the United States where grain fermentations in normal times are carried out for beverage production exclusively, the malt process is considered necessary in order to maintain the flavor and aroma to which the consumers are accustomed. There has, however, been an interest from time to time in other methods of conversion, because the supply of high-quality malt has at times been insufficient to meet the demand and also because malt is expensive.

A number of investigators have proposed the use of mold amylase as an aid to malt or to replace malt in the conversion of starch to fermentable sugars. In most cases these investigators contemplated the use of moldy bran. Study of these processes and others which have been proposed shows that the quantity of diastatic material needed for an industrial plant where amylase-containing material, such as mold bran, is used as a malt substitute calls for a manufacturing operation of considerable magnitude and complexity to supply enough enzyme for the conversion process. As a result, the use of mold bran has not been widely undertaken in distilleries.

Processes are also known in which mold amylase is substituted for all the malt customarily employed in the grain fermentation. The mold is grown submerged in the grain mash itself with high aeration in the fermentation vessel, and at first sight this procedure would seem to be a satisfactory method for the use of mold amylase in place of malt. Actually, however, the process has had limited applicability because as originally proposed it requires rigorous pure culture conditions in order to succeed. Deviation from sterilized pure culture procedures is said to be permissible in a modification of the process in that open fermentation vessels may be used. Sterilization of the grain, however, is required and yields are said to be lower in such a process. The necessity of pure culture procedure, special equipment, laboratories, and trained laboratory and plant personnel has stood in the way of general adoption of processes in which mold amylase is substituted for all the malt in the grain fermentation.

This being in brief the state of the art of starch saccharification, it is therefore an object of this invention to provide a novel and improved method for converting starch to fermentable sugars in which a major portion of the malt generally employed may be replaced by a medium in which a culture of starch converting mold has been grown. It is also an object of this invention to provide a method for converting starch into sugars in which rigorous pure culture conditions need not be maintained.

It is a further object of this invention to provide a method for promoting the growth of a starch converting mold in grain stillage, which may then be used as a substitute for a major portion of the malt usually employed in a process for converting starch. It is also an object of this invention to provide a new medium for saccharifying starch.

Other objects and advantages of this invention will be apparent to those skilled in the art upon their reading of this specification, in which the practice of this invention is fully described.

These and other objects are accomplished in accordance with the broadest aspects of this invention by growing a starch saccharification mold in grain stillage containing as an essential ingredient metallic aluminum powder. Grain stillage is dealcoholized beer, and is the residue which remains after the alcohol has been distilled from the beer. Thus, stillage contains the original components of the grain minus most of the grain carbohydrates, and in addition it contains yeast and yeast products and such metals and bacterial products as it may have acquired during the processing operations. Either whole unscreened stillage containing both soluble matter and suspended solids or screened stillage containing primarily soluble materials may be used in applying the method of this invention.

Grain stillage in which a starch saccharification mold has been grown may be employed in conjunction with a minor proportion of malt to convert starch to fermentable sugars in accordance with the more narrow aspects of this invention.

The following four examples illustrate the method of this invention for growing mold in various types of grain stillage.

Example I

Four 100 cc. amounts of clear filtered stillage from plant stills operating on wheat granular flour beer were sterilized in 250 cc. flasks. Two of the flasks had aluminum powder added to them, while the other two received none. Each flask was seeded with 0.5 cc. of a mold spore suspension (Rhizopus boulard) and agitated mechanically for 72 hours. The mold mycelia were then recovered by filtration, and the dry weights of the mycelia are given in the following table:

| No. | Grams Aluminum Powder Added | Grams Dry Mold |
|---|---|---|
| 1 | .0005 | .2439 |
| 2 | .0005 | .2605 |
| 3 | None | .0723 |
| 4 | None | .0690 |

Example II

A laboratory fermentation was made on whole wheat by the low temperature infusion process. Filtered stillage from the fermentation was used with and without aluminum powder as a mold growing medium. The clear stillage in 100 cc. amounts was sterilized in 500 cc. flasks, inoculated with 0.5 cc. of a mold spore suspension of Rhizopus boulard, and agitated mechanically to obtain submerged growth. The following weights of dry mold were obtained:

| No. | Grams Aluminum Powder Added | Grams Dry Mold |
|---|---|---|
| 1 | None | .0929 |
| 1-A | .0005 | .2012 |
| 2 | None | .0791 |
| 2-A | .0005 | .2086 |
| 3 | None | .1127 |
| 3-A | .0005 | .5302 |
| 4 | None | .1015 |
| 4-A | .0005 | .3397 |

Example III

Stillage from laboratory fermentation pressure cooked yellow corn meal converted by 6% barley malt was filtered and was distributed in 100 cc. amounts to four 500 cc. flasks. Two of the flasks received aluminum powder while the other two flasks did not. Each of the flasks was inoculated with spores of Rhizopus boulard as described in Example I, and was mechanically agitated for 48 hours. The dry weights of mold developed under these conditions were as follows:

| No. | Grams Aluminum Powder Added | Grams Dry Mold |
|---|---|---|
| 1 | None | .2412 |
| 1-A | None | .2591 |
| 2 | .0005 | .3005 |
| 2-A | .0005 | .3120 |

Example IV 1500 gal. of milo-maize stillage from a continuous pressure cooking process was diluted with water to give a final volume of 3,000 gallons. Six pounds of ammonium sulphate was added. The diluted slop was then sterilized with direct steam for one hour at 15 lbs. per square inch gage pressure, cooled to 95° F. and seeded with 4,000 cc. of a mixture of spores and mycelium of Rhizopus boulard. After 24 hours aeration at 95° F. no mold growth could be demonstrated. Before seeding this tank, two 4,000 cc. batches of the sterilized mash were withdrawn and metallic aluminum powder was added in the concentration of 0.0005 gram per 100 cc. of mash in one flask only. Both flasks were again sterilized at 15 lbs. per square inch gage pressure for 30 minutes, cooled and seeded with spores of Rhizopus boulard. After 24 hours aeration at 90° F., heavy mold growth was obtained in the flask containing aluminum, whereas no growth was obtained in the flask containing no aluminum.

Thus, it is noted that under plant conditions, which included long holding periods at high temperatures in the presence of metals, the effect of aluminum powder addition on mold growth was more striking than when the experiments were made in glass apparatus.

The above examples illustrate the novel method of this invention for the promotion of mold growth in grain stillage by adding metallic aluminum powder thereto. The mold may be grown in grain stillage derived from any source. Thus, in place of the grain stillage obtained from wheat, corn, and milo-maize shown in the examples, there may be used instead a stillage derived from rye, etc. The method of this invention has been found applicable in growing in grain stillage any of the organisms of the genus Mucoracae and the genus Aspergilli. Hence, Aspergillus oryzae, Rhizopus delemar, etc. may be substituted for the Rhizopus boulard used in the examples.

The following example illustrates the method of this invention for the saccharification of starch, employing grain stillage in which a culture mold had been grown to assist in effecting the starch conversion.

Example V

In this example the mold was grown in three successive stages. The first was a laboratory stage and the next two were in plant vessels of 75 gal. and 2500 gal. working capacity, respectively. Mold from the last vessel was added to an infusion mash of granular wheat flour in a 20,000 gal. fermenter along with 4% of yeast, based upon the total volume of converted mash added to the fermenter. Further details are as follows:

*Laboratory stage.*—Spores of Rhizopus boulard were developed in a 1,000 cc. Erlenmeyer flask on a pad of granular flour paste which was prepared from 25 gm. of flour, 500 cc. of water, and 0.1 gm. of ammonium sulphate and which was sterilized for one hour with 15 lbs. per square inch gage pressure steam. The flask was inoculated from malt agar slants of Rhizopus boulard and was allowed to incubate until the mold was well sporulated. The spores from the pad were suspended in 3,000 cc. of sterile water, and this was the inoculum for the first plant stage.

*First plant stage.*—This stage was carried out in a jacketed steel pressure vessel which was designed for pure culture operation and which had a working capacity of 75 gallons. A mash was made up as follows:

| | | |
|---|---|---|
| Ground malt | lbs | 20 |
| Zinc sulfate | gm | 5 |
| Phosphoric acid | cc | 100 |
| Ammonium sulfate | gm | 200 |
| Water to make 75 gal. pH | | 3.8 to 4.0 |

The mixture was sterilized for one hour with 15 lbs. per square inch gage pressure steam, Thereafter the cooked mash was cooled to 90° F. and inoculated with the 3,000 cc. of mold spore suspension using precautions against infection with foreign organisms. The inoculated mash was aerated under about 5 lbs. per square inch gage pressure. A heavy development of mold mycelium resulted in about 20 hours, and this mold was used to inoculate the second plant stage.

*Second plant stage.*—This stage was carried out in a closed steel pressure vessel which had a working capacity of 2500 gal. and which was equipped with cooling coils. The composition of the mold growing mash was as follows:

500 gal. granular flour and malt from plant mashing system
300 gal. stillage derived from wheat granular flour
0.5 lb. aluminum powder
20 gm. zinc sulfate and 6 lbs. ammonium sulfate
1000 cc. concentrated sulfuric acid
Water to give about 2500 gal. (including condensate from steam used to sterilize)
pH, 3.8 to 4.2

The solution was sterilized for one hour with 15 lbs. per square inch gage pressure steam, and cooled to 95° F. It was inoculated by blowing the mold culture developed in the first plant stage into the second by means of air. The inoculated second stage was then aerated under 5 lbs. per square inch gage pressure for 24 hours, at which time a very heavy growth of mold had developed.

*Final or fermenter stage.*—Following the preparation of the mold in the second plant stage, pure culture conditions were no longer maintained. Granular wheat flour mash containing antiseptics was converted in mash tubs equipped with mechanical agitators, using 2% of barley malt, based upon the weight of the grain in the mash. In this cooking operation the mash was heated at 145° F. for one hour. At the end of the conversion period the mash was thereafter pumped in three portions through coolers to the 20,000 gal. capacity fermenter, where 4% of yeast, based upon the total volume of mash added to the fermenter, and mold grown in the second plant stage were added to the first portion of mash pumped. The first pumping represented about 30% of the total amount of mash added to the fermenter. This first portion was aerated gently for 3-4 hours, after which the fermenter was filled to 20,000 gal. by the addition of two more portions of mash. After this the batch was permitted to ferment to completion with resultant production of ethyl alcohol.

A series of fermenter batches to which there had been added 12% of mold, based upon the total volume of the mash in the fermenter and prepared in the second plant stage, required about 40 hours for each batch to ferment to completion. Another series of batches to which 6% of mold prepared in the second plant stage was added had an average fermentation time of 55 hours. Both of these series of batches represented an improvement in comparison with fermenter batches to which 10% of barley malt was added without the addition of any mold.

Example V illustrates the method of this invention for the saccharification of starch which comprises heating a mixture of starch, water, and a small amount of malt to such a temperature and for such a period of time as will solubilize the starch, cooling the mixture, adding grain stillage in which there has been grown an organism of the genus Mucoracae or genus Aspergilli, and then permitting the mixture to ferment to completion. This method may be employed in fermenting any grain, and thus in place of the wheat shown in Example V may be used corn, rye, etc. The molds may be grown in grain stillage derived from any source. In accordance with the method, a small percentage of malt is added to the mash before cooking. The amount of grain stillage added thereafter will depend upon the amount of malt added before cooking of the mash and upon other factors. Usually, however, the amount of grain stillage which it will be found desirable in practice to employ will amount to about 6–12% of the total volume of mash contained in the fermenter.

The method of this invention constitutes a novel and valuable procedure for promoting the submerged growth of starch saccharification molds in grain stillage. The stillage containing such a mold may be advantageously used in the process described herein, in which starch is converted to fermentable sugars, which in turn are used for fermentation ethyl alcohol production, but such stillage may also be employed for other purposes. The method of this invention for the saccharification of starch presents various advantages over prior art processes. Thus, a large portion of the malt generally used may be substituted by the grain stillage containing the mold, and as a result the malt is replaced by a much cheaper material. Furthermore, pure culture conditions need not be maintained in accordance with the fermentation method of this invention, and hence special equipment and highly trained personnel are not required.

We claim:

1. A method of growing mold which comprises growing in grain stillage an organism selected from the class consisting of the genus Mucoracae and the genus Aspergilli, the said stillage containing metallic aluminum powder in an amount sufficient to promote the growth of said organism in said stillage.

2. A method of growing mold which comprises growing in grain stillage an organism of the genus Mucoracae, the said stillage containing metallic aluminum powder in an amount sufficient to promote the growth of said organism in said stillage.

3. A method of growing mold which comprises growing in grain stillage an organism of the genus Aspergilli, the said stillage containing metallic aluminum powder in an amount sufficient to promote the growth of said organism in said stillage.

4. A method of growing mold which comprises growing in wheat stillage the organism Rhizopus delemar, the said stillage containing metallic aluminum powder in an amount sufficient to promote the growth of said organism in said stillage.

5. A method of growing mold which comprises growing in wheat stillage the organism Aspergillus oryzae, the said stillage containing metallic aluminum powder in an amount sufficient to promote the growth of said organism in said stillage.

6. The method of producing ethyl alcohol by fermentation which comprises growing in grain stillage a mold selected from the class consisting of the genera Mucoracae and Aspergilli, said stillage containing metallic aluminum powder in an amount sufficient to promote the growth of said mold in the stillage, preparing separately and heating a mash containing amylaceous material and a small amount of malt to such a temperature and for such period of time as will solubilize the amylaceous content thereof, cooling the mash, adding the stillage containing the mold together with yeast to the cooked and cooled mash, and permitting the resultant mixture to ferment with production of alcohol.

7. The method of producing ethyl alcohol as set forth in claim 6 in which the mold is of the genus Mucoracae.

FRANK M. HILDEBRANDT.
NORRIS M. ERB.

REFERENCES CITED

The following references are of record in the file of this patent:

UNITED STATES PATENTS

| Number | Name | Date |
|---|---|---|
| 1,899,156 | Kluyver et al. | Feb. 28, 1933 |
| 1,969,218 | Hancock | Aug. 7, 1937 |
| 2,342,330 | Christensen | Feb. 22, 1944 |
| 2,352,168 | Christensen | June 27, 1944 |
| 2,447,814 | Novak | Aug. 24, 1948 |

FOREIGN PATENTS

| Number | Country | Date |
|---|---|---|
| 17,374 | Great Britain | Of A. D. 1891 |

OTHER REFERENCES

Steinberg, Bull. Torrey Botanical Club 61, 241–248 (1934).

Wells et al., Chem. and Met. Eng. 44 (Apr. 1937).

Bacterial Chemistry and Physiology by Porter, 1946 ed., page 627.

American Type Culture Collection, p. 106, 4th ed., 1938, published by Georgetown University School of Medicine, 3900 Reservoir Road, Washington, D. C.

Enzymes by Sumner and Somers, 1943 ed., p. 18.